United States Patent
Sawdon et al.

(10) Patent No.: US 6,829,678 B1
(45) Date of Patent: Dec. 7, 2004

(54) SYSTEM FOR DETERMINING THE ORDER AND FREQUENCY IN WHICH SPACE IS ALLOCATED ON INDIVIDUAL STORAGE DEVICES

(75) Inventors: Wayne A. Sawdon, San Jose, CA (US); Roger L. Haskin, Morgan Hill, CA (US); Frank B. Schmuck, Campbell, CA (US); James C. Wyllie, Monte Sereno, CA (US)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 09/618,332

(22) Filed: Jul. 18, 2000

(51) Int. Cl.[7] .............................................. G06F 12/02
(52) U.S. Cl. .......................................... 711/114; 711/4
(58) Field of Search ............................ 711/4, 111, 112, 711/114, 157, 170, 172, 173; 713/330

(56) References Cited

U.S. PATENT DOCUMENTS

| | | | |
|---|---|---|---|
| 4,467,421 A | * 8/1984 | White ........................ 711/118 |
| 5,423,046 A | * 6/1995 | Nunnelley et al. .......... 713/330 |
| 5,583,995 A | 12/1996 | Gardner et al. | |
| 5,600,820 A | * 2/1997 | Johnston ..................... 711/171 |
| 5,659,704 A | * 8/1997 | Burkes et al. ............... 711/114 |
| 5,708,660 A | * 1/1998 | Riedel ......................... 370/397 |
| 5,724,539 A | * 3/1998 | Riggle et al. ............... 711/100 |
| 5,732,239 A | 3/1998 | Tobagi et al. | |
| 5,754,756 A | 5/1998 | Watanabe et al. | |
| 5,774,643 A | 6/1998 | Lubbers et al. | |
| 5,845,319 A | 12/1998 | Yorimitsu ................... 711/114 |
| 5,937,428 A | 8/1999 | Jantz .......................... 711/114 |
| 5,943,690 A | 8/1999 | Dorricott et al. ........... 711/171 |
| 5,960,446 A | 9/1999 | Schmuck et al. ........... 707/205 |
| 5,963,963 A | * 10/1999 | Schmuck et al. ........... 707/205 |
| 6,016,552 A | 1/2000 | Lee et al. ....................... 714/6 |
| 6,023,706 A | 2/2000 | Schmuck et al. ........... 707/200 |
| 6,055,354 A | * 4/2000 | Bopardikar .................. 386/46 |
| 6,275,917 B1 | * 8/2001 | Okada ......................... 711/207 |
| 6,279,052 B1 | * 8/2001 | Upadrastra .................. 710/22 |
| 6,327,638 B1 | * 12/2001 | Kirby ............................ 711/4 |
| 6,425,052 B1 | * 7/2002 | Hashemi ..................... 711/114 |
| 6,629,201 B2 | * 9/2003 | Dempsey et al. ........... 711/113 |

FOREIGN PATENT DOCUMENTS

| GB | 2312316 A | * 10/1997 |
|---|---|---|
| JP | 411203055 A | * 7/1999 |

OTHER PUBLICATIONS

IEEE 100: The Authoritative Dictionary of IEEE Standards Terms, 7th ed. IEEE Press, 2000, p. 1277.*

* cited by examiner

Primary Examiner—B. James Peikari
(74) Attorney, Agent, or Firm—Lawrence D. Cutter, Esq.; Blanche E. Schiller, Esq.; Heslin, Rothenberg, Farley & Mesiti P.C.

(57) ABSTRACT

Space is allocated on data storage devices in proportion to weights associated with the storage devices. The weights can be dynamically adjusted at any time in order to accommodate changes in the system and to better utilize the storage devices. The technique used to perform the allocating is independent of the weights used by the allocating. Further, the allocation technique can accommodate general purpose data streams having varying lengths and/or varying access patterns, as well as special purpose data streams, such as video streams.

74 Claims, 4 Drawing Sheets

SYSTEM FOR DETERMINING THE ORDER AND FREQUENCY IN WHICH SPACE IS ALLOCATED ON INDIVIDUAL STORAGE DEVICES

CROSS-REFERENCE TO RELATED APPLICATIONS

This application contains subject matter which is related to the subject matter of the following application/ issued patent, each of which is assigned to the same assignee as this application. Each of the below listed applications/patents is hereby incorporated herein by reference in its entirety:

"A Plurality Of File Systems Using Weighted Allocation To Allocate Space On One Or More Storage Devices," Sawdon et al., Ser. No. 09/618,508, filed Jul. 18, 2000; and "Parallel File System And Method With Allocation Map," Schmuck et al., U.S. Pat. No. 5,960,446, Issued Sep. 28, 1999.

TECHNICAL FIELD

This invention relates, in general, to allocating space on data storage devices, and in particular, to using weights to determine the order and frequency in which space is allocated on individual storage devices.

BACKGROUND ART

Many computing environments include file systems, which enable other application programs to store data on and retrieve data from storage devices. In particular, a file system allows application programs to create files and to give them names (a file is a named data object of arbitrary size), to store (or write) data into files, to read data from files, to delete files, and perform other operations on files.

A file structure is the organization of data on the storage devices. In addition to the file data itself, the file structure contains meta data, which includes, for instance, the following: a directory that maps file names to the corresponding files; file meta data that contains information about the file, including the location of the file data on the storage device (i.e., which device blocks hold the file data); an allocation map that records which device blocks are currently in use to store meta data and file data; and a super-block that includes overall information about the file structure (e.g., the locations of the directory, allocation map, and other meta data structures).

In order to store successive data blocks of a file to distinct devices, such as disks or other storage devices, a technique known as data striping is used. Data striping may also be used to store the file system's meta data. The advantages of striping include high performance and load balancing. In data striping, the file system writes successive blocks of a file, or the file's meta data, to distinct devices in a defined order. For example, the file system may use a round-robin allocation, in which successive blocks are placed according to a cyclic permutation of the devices. This permutation is called the data stripe order. The stripe order defines the order and frequency of allocations (and thus, writes) to each device in the file system. For example, a system with four disks using a simple round-robin allocation scheme would allocate space on each disk in consecutive order, namely: 1, 2, 3, 4, 1, 2, 3, 4 . . . Hereinafter, "data stripe" and "stripe," as well as "data striping" and "striping" are used interchangeably.

This simple round-robin allocation is used by most striped file systems for allocation. Although, round-robin allocations may be sufficient in some circumstances for a system that includes homogeneous devices, it proves to be inadequate for a system with heterogeneous devices, and it proves to be inadequate for various circumstances in which homogeneous devices are used.

As one example, a round-robin allocation is inadequate for devices of different storage capacities or throughput. Under round-robin allocation, all devices are allocated equally. Consequently, subsequent access to the data is typically spread equally across the devices as well. For systems that include devices with different storage capacities, the small devices fill before the larger devices and then, must be excluded from the stripe order, thus reducing the parallelism and performance for all subsequent writes. Furthermore, the data striped across the reduced set of devices has reduced performance for all subsequent accesses.

Likewise, for systems that include devices with different throughput, round-robin allocation fails to maximize the throughput for allocation and all subsequent accesses to the data. Additionally, round-robin allocation has no capability for rebalancing a system that begins in an unbalanced state. An unbalanced state can occur for a variety of reasons including, for instance, when devices are partitioned between file or operating systems; when empty devices are added to an existing file system; or when the allocation policy changes. To rebalance such a system, extraordinary measures are required by the user, such as restriping of all the data in the file system.

Thus, a need still exists for an allocation technique that is general enough to be used in a wide variety of circumstances. Further, a need exists for a capability that enables rebalancing of the allocations to better match the current conditions and requirements of the system and/or devices.

SUMMARY OF THE INVENTION

The shortcomings of the prior art are overcome and additional advantages are provided through the provision of a method of managing the allocation of space on storage devices. The method includes, for instance, obtaining weights for at least a subset of a plurality of storage devices, the subset comprising at least two storage devices; and allocating space on multiple storage devices of the at least a subset of storage devices in proportion to weights obtained for the multiple storage devices, wherein the allocating is independent of access patterns of data to be accommodated by the allocated space in that the allocating lacks apriori knowledge of the access patterns.

In a further embodiment of the invention, a method of managing the allocation of space on storage devices is provided. The method includes, for instance, obtaining weights for at least a subset of a plurality of storage devices; and generating a stripe order using one or more of the weights, the stripe order indicating an order and frequency of allocating space on multiple storage devices of the plurality of storage devices, and wherein the generating is independent of a weighting assignment used in obtaining the weights.

System and computer program products corresponding to the above-summarized methods are also described and claimed herein.

The capabilities of one or more aspects of the present invention advantageously provide for the allocation of space across a plurality of storage devices, such that the space on each device is allocated and thus, consumed in proportion to some weight assigned to that device. The weight assigned to each device determines the allocation policy and allows the file system to balance the allocation across the devices. The weights and the allocation policy are independent of the technique used for allocation. This allows the policy to be changed dynamically to better match the current conditions and requirements.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, space is allocated on multiple storage devices in proportion to weights associated with those devices. In particular, weights obtained for the storage devices are used to generate a stripe order, which provides the order in which space on individual storage devices is to be allocated and the frequency of allocating space on those devices.

As used herein, the obtaining of weights can be accomplished in any manner including, but not limited to, receiving the weights, and assigning the weights. Further, as used herein, a weight is a relative value obtained for data storage devices to indicate how one data storage device compares to another. This obtained value (i.e., weight) indicates, for instance, characteristics or capabilities of one data storage device relative to another. As one example, relative capacities of data storage devices can be indicated by values (i.e., weights) assigned to the devices such that a data storage device having a greater capacity is assigned a higher value. Other examples are described further below.

Figure 1:
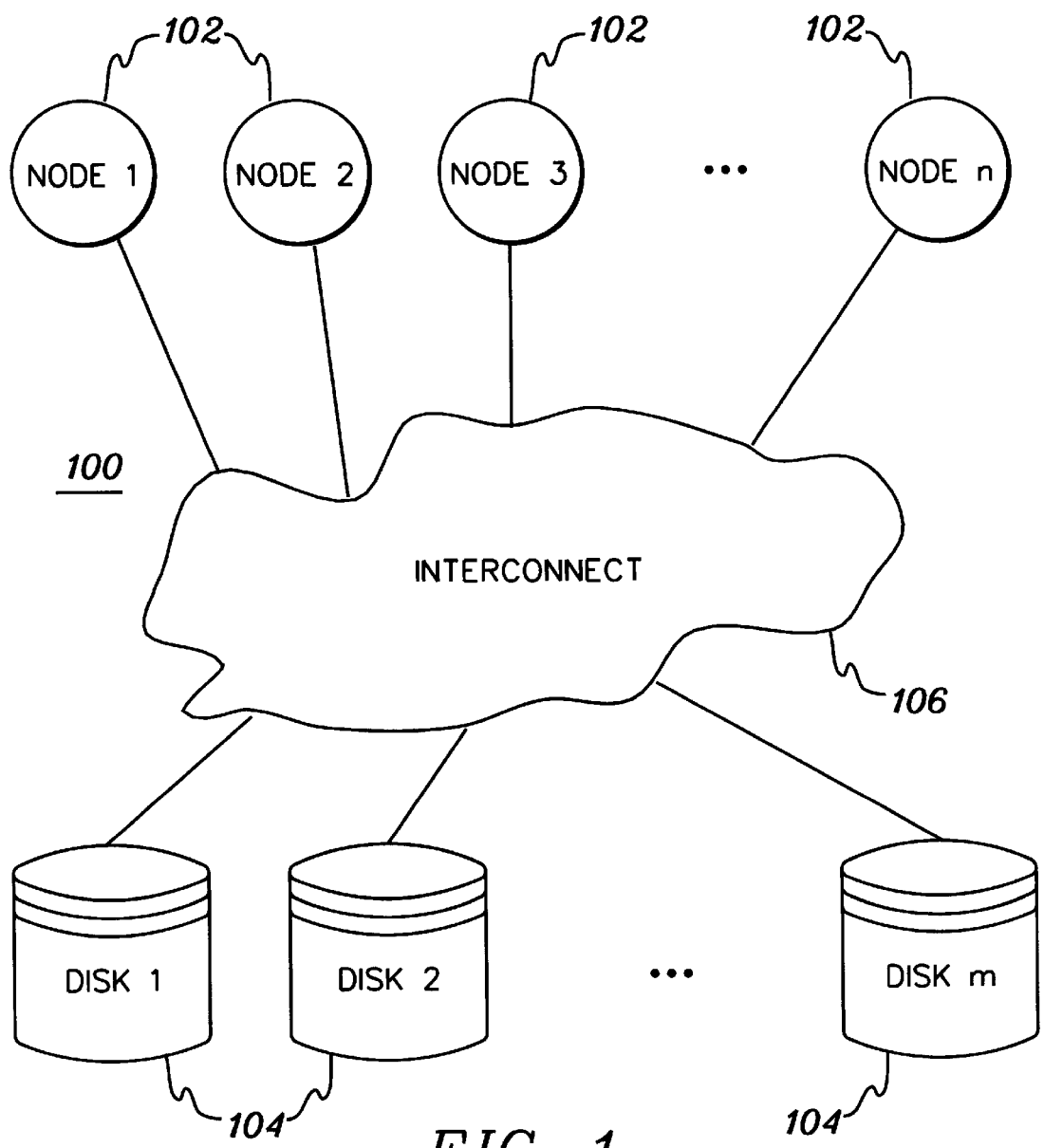
FIG. 1 depicts one example of a computing environment incorporating and using one or more aspects of the present invention.

One embodiment of a computing environment incorporating and/or using aspects of the present invention is described with reference to FIG. 1. Computing environment 100 includes one or more nodes 102 (e.g., Node 1, ... Node n), which share access to one or more storage devices 104 (e.g., Disk 1 ... Disk m, or other non-volatile memory). The nodes are coupled to each other and to the storage devices via an interconnect 106. In one example, the interconnect includes a wire connection, token ring or network connection, to name just a few examples. One communications protocol used by one or more of these connections is TCP/IP.

Figure 2:
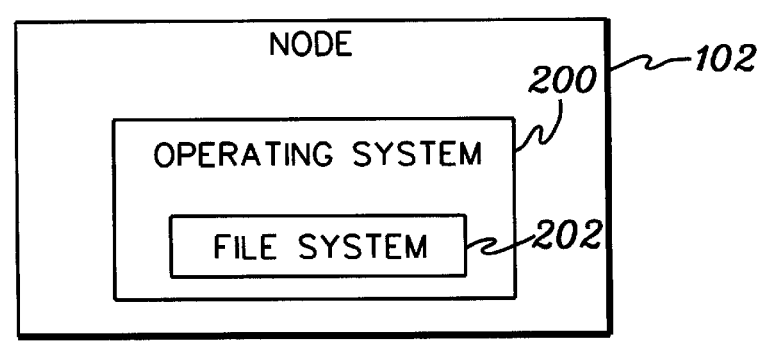
FIG. 2 depicts further details of a node of FIG. 1, in accordance with an aspect of the present invention.

As one example, a node 102 includes an operating system 200 (FIG. 2), such as the AIX operating system offered by International Business Machines Corporation. The operating system includes a file system 202 (e.g., a software layer), such as the General Parallel File System (GPFS) offered by International Business Machines Corporation, which is used to manage the allocation of space on the various storage devices.

In accordance with an aspect of the present invention, file system 202 allocates space on the various storage devices, such that the total allocation on each storage device is proportional to a weight obtained for (e.g., assigned to) that device. The weight obtained for each device is used in determining the allocation policy and allows the file system to balance the allocation across the devices to match individual device capacities and to better utilize the combined throughput of the devices. However, the weights and the allocation policy (i.e., the order and frequency of allocations on each device) are independent of the technique used for the allocation. That is, different allocation techniques can be used for the allocation. The allocation technique is not tied to the weights. This allows the weights to represent a variety of parameters (e.g., capacity weighting, throughput weighting, round-robin weighting, hybrid weighting, etc.), and allows the weights to dynamically change. Thus, the allocation policy can be changed at any time to better suit the current conditions or requirements. Further, any weighting technique used in obtaining the weights need not be known to the allocation technique.

Many different allocation techniques can be used to allocate space on the storage devices. One such technique, in accordance with an aspect of the present invention, is a deterministic technique, which is described with reference to FIGS. 3-6. The logic of those figures is performed by, for instance, a file system.

Figure 3:
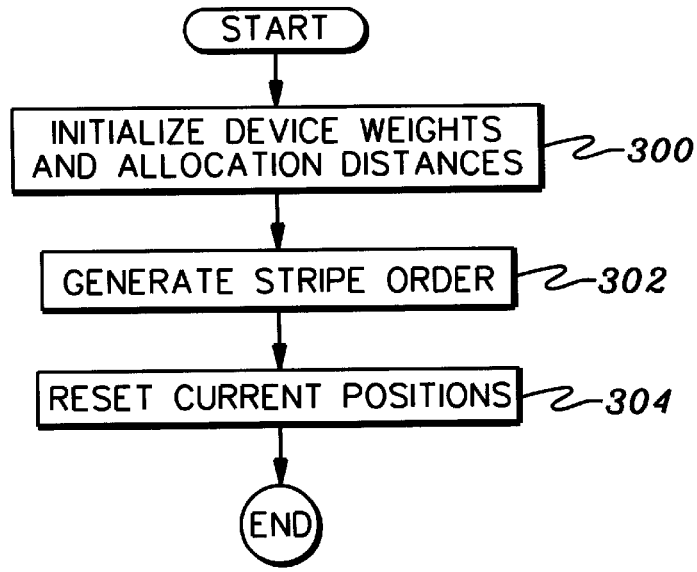
FIG. 3 depicts one embodiment of the logic associated with a deterministic allocation technique, in accordance with an aspect of the present invention.
Figure 4:
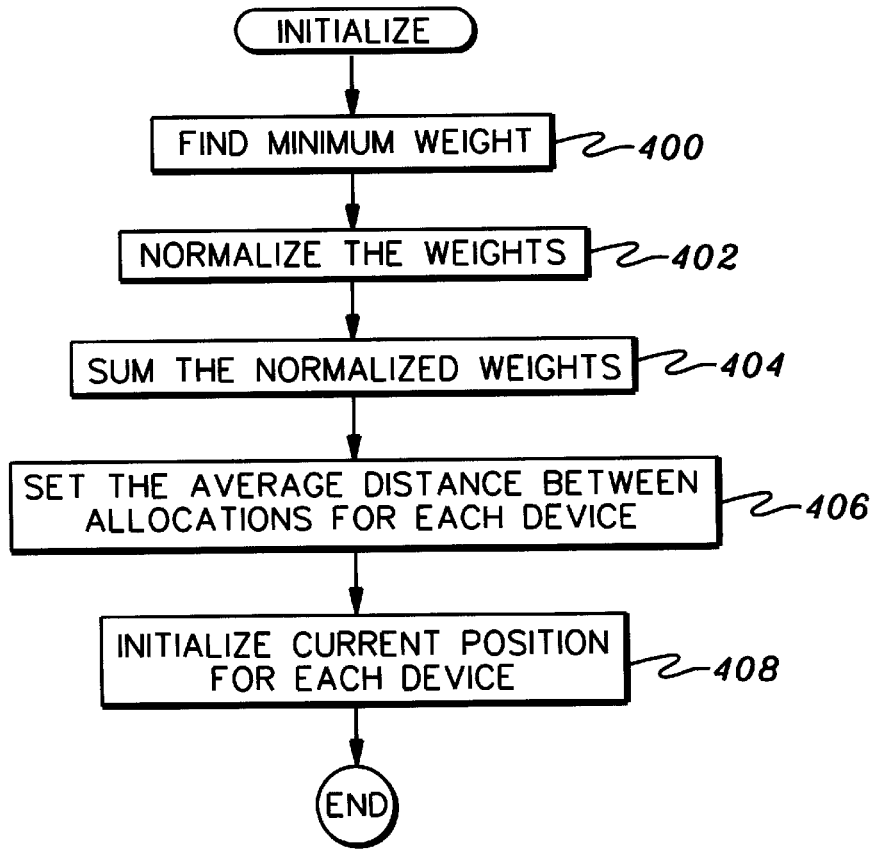
FIG. 4 depicts one embodiment of the logic associated with initializing device weights and allocation distances for the deterministic technique of FIG. 3, in accordance with an aspect of the present invention.
Figure 5:
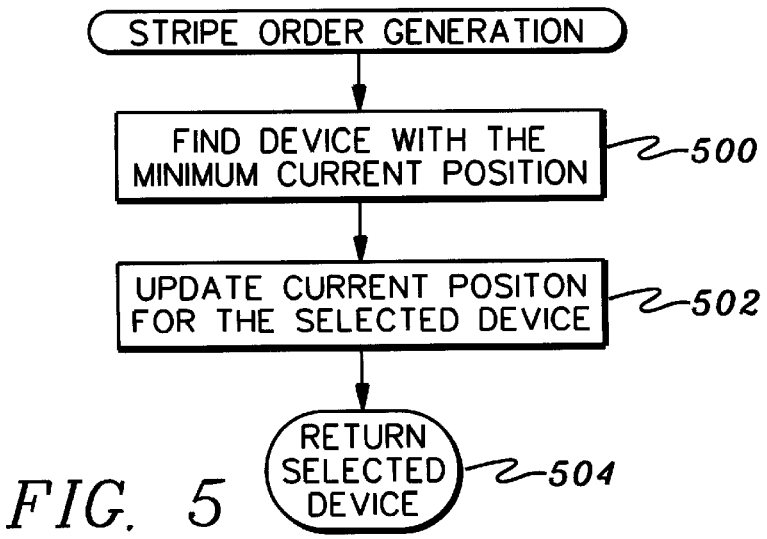
FIG. 5 depicts one embodiment of the logic associated with generating a stripe order for the deterministic technique of FIG. 3, in accordance with an aspect of the present invention.

As shown in FIG. 3, in one embodiment, the deterministic technique includes three steps: an initialization step 300, a stripe order generation step 302 and a weight adjustment step 304, each of which is described below.

Initialization step 300 includes providing each of a plurality of devices (either all or some subset of the storage devices associated with the file system) with a weight and an allocation distance. One embodiment of this initialization is described with reference to FIG. 4.

Initially, from a given list of devices and associated weights, where the weights are greater than zero, the lowest weight in the list is determined, STEP 400. In one example, this includes a linear scan over the weights in the list to find the lowest weight. However, for other embodiments, a heap or priority queue could be used to improve the efficiency of the technique.

Subsequent to finding the minimum weight, the weights are normalized such that the lowest weight is 1.0 and the other weights are proportionally higher, STEP 402. This is accomplished by dividing each of the weights by the minimum weight. For example, given four devices with weights [1000, 1500, 2000, 2500], the normalized weights are [1, 1.5, 2.0, 2.5].

Thereafter, the normalized weights are summed to obtain a total weight, STEP 404. Thus, for the above example, the total weight is seven (1+1.5+2.0+2.5=7).

The total weight and normalized weights are then used to set the average distance between allocations for each device, STEP 406. In one example, the average distance between allocations for a device is computed by dividing the total weight of the devices (e.g., 7) by the normalized weight for that device. Thus, in the example described above, the average allocation distance for each of the four devices is 7, 4.3, 3.5 and 2.8, respectively.

Thereafter, the current position for each device is initialized to the average allocation distance for that device, STEP 408. That is, Device 1 is initialized to 7, Device 2 is initialized to 4.3, Device 3 is initialized to 3.5 and Device 4 is initialized to 2.8, in the example provided herein. This completes the initialization step of FIG. 3.

One example of pseudocode used to initialize device weights and allocation distances is listed below:

Initialize the device weights and allocation distances:

```
// Find the minimum weight
minWeight = Weight[device#1]
foreach (device)
    If Weight[device] < minWeight
        then minWeight = Weight[device]
end foreach
// Normalize all weights
foreach (device)
    normalWeight[device] = Weight[device]/
        minWeight
end foreach
//Sum the normalized weights
totalWeight = 0
foreach (device)
    totalWeight = totalWeight + normalWeight
        [device]
end foreach
//Set the average distance between allocations
    for each device
foreach (device)
    allocDistance[device] = totalWeight/
        normalWeight[device]
end foreach
//Finally, initialize the current position for
    each device
foreach (device)
    currenPosition[device] = allocDistance[device]
end foreach
```

Returning to FIG. 3, subsequent to initializing the device weights and allocation distances, a stripe order is generated, STEP 302. The stripe order defines the order in which each device is allocated space and the frequency of which space is allocated to a device. One example of generating a stripe order is described with reference to FIG. 5.

To generate the stripe order, each device is selected in turn. In one example, the next device to be selected for the stripe order is the device with the lowest current position. Thus, that device is located, STEP 500. For example, using the four devices above, with normalized weights of [1.0, 1.5, 2.0, 2.5] and an average allocation distance of [7, 4.3, 3.5, 2.8], the device with the lowest current position is Device 4 with a current position of 2.8.

Subsequent to finding the device with the minimum current position, the current position for that selected device is updated, STEP 502. In one example, the current position is updated by adding the average allocation distance of that device to its current position. Thus, for Device 4, 2.8 is added to its current position of 2.8, yielding 5.6. This selected device is then returned to the caller, STEP 504.

The above is repeated for the desired number of allocations in the stripe order. In one example, the first fourteen allocations in the stripe order for the above example would be 4, 3, 2, 4, 1, 3, 4, 2, 3, 4, 1, 2, 3, 4. Thus, Device 1 has two allocations, Device 2 has three allocations, Device 3 has four allocations, and Device 4 has five allocations, which is in proportion to the weights assigned to each device.

One embodiment of pseudocode associated with selecting the next device in the stripe order is depicted below.

Selecting the next device in the stripe order:

```
//Find the device with the minimum current
    position
minDevice = device#1
foreach (device)
    if currentPosition[device] < currentPosition
        [minDevice]
        minDevice = device
end foreach
// Update the current position for the selected
    device
currentPosition[minDevice] = currentPosition
    [minDevice] + allocDistance[minDevice]
// Return the selected device to the caller
return minDevice
```

Returning to FIG. 3, although logically the current position for each device monotonically increases, an implementation of the technique periodically resets the current positions to prevent them from overflowing their counters or losing precision. A loss of precision would cause the allocation to no longer be proportional to the weight assigned to each device. Thus, one step of the deterministic technique is to reset the current positions, STEP 304. The resetting operation can be performed after each allocation or via some trigger, such as when the minimum current position exceeds some preset threshold.

Figure 6:
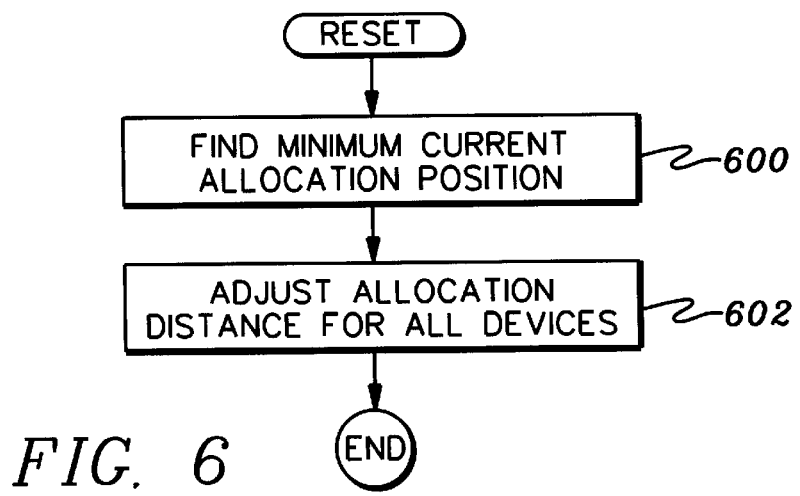
FIG. 6 depicts one embodiment of the logic associated with resetting current positions for the deterministic technique of FIG. 3, in accordance with an aspect of the present invention.

One embodiment of the logic associated with resetting the current positions is described with reference to FIG. 6. To ensure that the allocations generated by the stripe order remain proportional to the assigned weights, the current position for the each device is decremented by an equal amount. This is accomplished by finding the minimum current position among the devices, STEP 600, and then subtracting it from the current position for each device, STEP 602. This technique is further shown in the pseudocode below.

Resetting the current positions:

```
//Find the minimum current allocation position
MinPosition = currentPosition[device#1]
foreach (device)
    if currentPosition[device] < minPosition
        minPosition = currentPosition[device]
end foreach
// Adjust the allocation distance for all devices
foreach (device)
    currentPosition[device] =
        currentPosition[device] - minPosition
end foreach
```

Described above is one allocation technique for allocating space across multiple storage devices based on weights associated with those storage devices. Another technique used for such allocation is referred to as a randomized technique. The randomized technique is an alternative implementation for weighted allocation based on a randomized selection of each device in the stripe order. The weight assigned to each device is used to bias the random selection so that the allocation is proportional to the weights.

In one example, randomized weighted allocation is performed in cycles. The weights of the devices are maintained as floating point numbers. The integer portion of each weight is used to determine the number of allocations to that device in each cycle. The sum of the integer portions determines the total number of allocations in the cycle. As each cycle completes, the initial normalized weights are added into the current weights and the next cycle of allocation can begin. The fractional portions of each weight accumulate across cycles to accurately maintain the weighted proportion.

Figure 8:
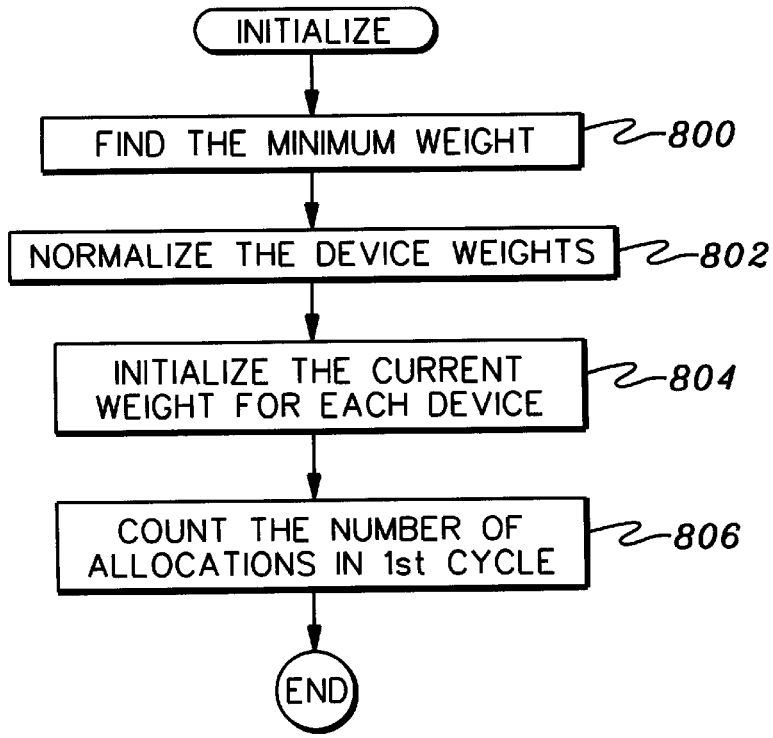
FIG. 8 depicts one embodiment of the logic associated with initializing device weights and total allocations for the randomized allocation technique of FIG. 7, in accordance with an aspect of the present invention.
Figure 9:
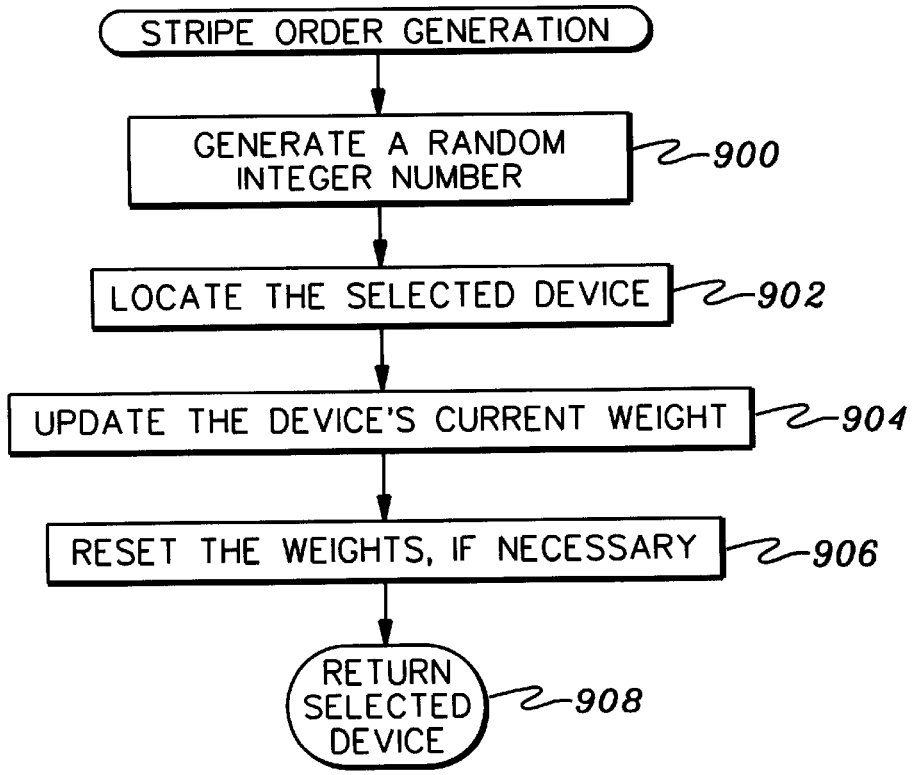
FIG. 9 depicts one embodiment of the logic associated with generating a stripe order for the randomized allocation technique of FIG. 7, in accordance with an aspect of the present invention.

One embodiment of the logic associated with a randomized allocation technique is described with reference to FIGS. 7–9. The logic of those figures is performed by a file system, as one example.

Figure 7:
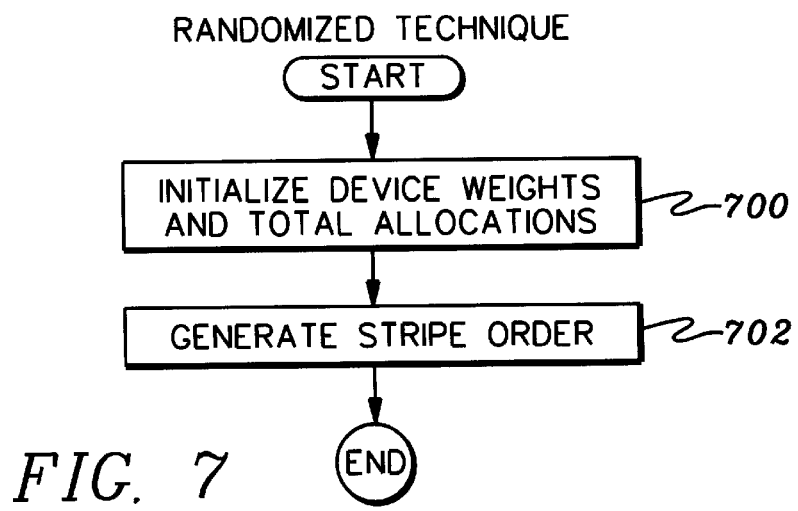
FIG. 7 depicts one embodiment of the logic associated with a randomized allocation technique, in accordance with an aspect of the present invention.

Referring to FIG. 7, the randomized technique is commenced with initializing device weights and total allocations, STEP 700. In particular, given a list of devices and the weight associated with each device, where the weights are greater than zero, the technique first normalizes the weights such that the lowest weight is 1.0 and the other weights are proportionally higher. This initialization is further described with reference to FIG. 8.

Initially, the minimum weight of the list of weights is found, STEP 800. Thereafter, the weight of each device is divided by the minimum weight in order to obtain a normalized weight for that device, STEP 802. The normalized weights are saved, and are also used to set the original current weights for the devices, STEP 804. In particular, the current weight for each device is initialized to its normalized weight.

Thereafter, the integer portion of the current weights are summed to determine the number of allocations in the first allocation cycle, STEP 806. For example, given four devices with weights [1000, 1500, 2000, 2500], the normalized weights are [1, 1.5, 2.0, 2.5], and the total allocations on the first cycle is 6 (1+1+2+2=6).

One embodiment of pseudocode employed to initialize the device weights and total allocations is provided below:

```
floating minWeight, Weight[ ]
floating normalWeight[ ], currentWeight[ ]
int device, allocsRemaining
// Find the minimum weight
minWeight = Weight[device#1]
foreach (device)
    if Weight[device] < minWeight
        then minWeight = Weight[device]
end foreach
// Normalize all the device weights
foreach (device)
    normalWeight[device] = Weight[device]/minWeight
end foreach
// Initialize the current weight for each device
foreach (device)
    currentWeight[device] = normalWeight[device]
end foreach
// Count the number of allocations in the first
    cycle
// Subroutine float2int will truncate the
    fractional portion of each floating number.
allocsRemaining = 0
foreach (device)
    allocsRemaining = allocsRemaining + float2int
        (currentWeight[device])
end foreach
```

Returning to FIG. 7, subsequent to initializing the device weights and total allocations, the data stripe order is generated, STEP 702. One embodiment of the logic associated with generating the data stripe order for the randomized technique is described with reference to FIG. 9.

Initially, a random integer number is generated, STEP 900. For example, a random number is selected within the range of 1 to the number of allocations remaining in the cycle (i.e., [1 . . . allocRemaining]). Thus, if the total allocations in this cycle is six, a random number from 1 to 6 is selected. This number is then used to select a device by counting the integer portions of the weights of each device until the number is reached, STEP 902. For example, for devices with current weights of [1, 1.5, 2.0, 2.5] and a random number of 4, a selection of Device 3 results (1 (of Device 1)+1(of Device 2)+2(of Device 3)=4). As a further example, a random number of 1 results in a selection of Device 1.

Once a device is selected, its current weight and the total allocations remaining in the cycle are both decremented by 1, STEP 904. When the total allocations remaining reaches 0, the cycle is complete. To start a new cycle, the initial normalized weights are added to the current weights and the number of allocations in the next cycle are counted, STEP 906.

Thereafter, the selected device is returned to the caller, STEP 908. The above procedure is repeated until each cycle is complete, in one example.

One embodiment of pseudocode used to select the next device in the stripe order is depicted below:

```
integer device, selectCount
integer allocsRemaining
floating currentWeight[ ], normalWeight[ ]
// Generate an integer random number between 0 and
    allocsRemaining-1
selectCount = random( ) mod allocsRemaining
// Scan the current device weights to locate the
    selected device
foreach (device)
```

```
            -continued if (currentWeight[device] >= 1.0) then
    if (currentWeight[device] >= selectCount)
        goto deviceFound;
    selectCount = selectCount - float2int
        (currentWeight[device])
    end if
end foreach
```

```
// Update the device's current weight
currentWeight[device] = currentWeight[device] - 1.0;
allocsRemaining = allocsRemaining - 1;
// Reset the weights to start a new cycle,
    if necessary
if (allocsRemaining == 0) then
    // Update each device's current weight
    foreach (device)
        currentWeight[device] = currentWeight[device]
            + normalWeight[device]
        allocsRemaining = allocsRemaining + float2int
            (currentWeight[device])
    end foreach
end if
// Return the selected device to the caller
return minDevice
```

Described in detail above are two implementations of weighted allocation. Although these particular techniques are described herein, the invention is not limited to such techniques. Any allocation technique, which can use weights to allocate, can be employed without departing from the spirit of the present invention.

Although weighted allocation depends on the weights to determine the allocation policy, the allocation techniques themselves are independent of the actual weights assigned to each device. The weights can be changed at any time, to adjust the load on each device as needed. Furthermore, the technique of assigning weights can be changed at any time. This allows the allocation policy to be set dynamically and adjusted to meet the current requirements of the system.

A variety of weighting techniques are available to assign the initial weights, including for instance, the following:

(1) Round-Robin Weighting—To implement a simple round-robin allocation, the weight of each device is set to 1. Using an equal weight for each device, the technique will allocate space on each device an equal number of times.

(2) Capacity Weighting—To better distribute the allocations across uneven sized devices, the weights can be assigned using the relative capacity of each device. This weighting technique causes the devices to fill in the same proportion (i.e., the percentage utilized on each device is the same, regardless of the capacity of the device). Consequently, the expected I/O load on each device is also in proportion the device's capacity.

(3) Free Space Weighting—The weights may be based upon the relative amount of free space on each device. Under this technique, devices with a higher percentage of free space receive proportionately more allocations. This serves to rebalance unevenly filled devices, which may have resulted from adding new devices to an existing system or previously using round-robin allocation on uneven sized devices. The weights can be adjusted dynamically to account for changes in the relative amount of free space. For devices that are evenly filled, the free space weighting technique is equivalent to capacity weighting.

(4) Throughput Weighting—The weights can also be assigned based on the relative performance of each device. Devices with higher throughput receive proportionately more allocations and consequently, more I/O requests on the average. This weighting attempts to maximize the total throughput of the combined devices. There are a number of ways to determine the throughput weights during initialization, including, for instance, reading the device throughput from a table or by measuring the device throughput by measuring the actual throughput to each device while the system is under a maximal I/O load.

(5) Hybrid Weighting—Not only can the weights be changed dynamically, the technique for assigning the weights can also be changed. Furthermore, a combination of two or more weighting techniques to produce a hybrid weighting can be used. This may be accomplished by computing the normalized weight for each device under more than one technique, then adding the normalized weights for a device from each desired technique. This allows the system to tailor the allocation to the current requirements and to change the allocation as the system changes.

Described in detail above is an allocation capability in which a stripe order is generated and used such that the total allocation on each device is proportional to the weight assigned to that device. The weighted allocation allows the system to balance the allocation to match the device capacities and to better utilize the combined throughput to the devices.

In one example, one or more stripe orders can be generated and used to allocate space across the storage devices. As examples, one stripe order can be used for all allocations of a file system; in another example, the storage devices are partitioned into groups, and a stripe order is generated and used for each group; and in yet another embodiment, a stripe order is generated for each file that is going to have space allocated therefor. Thus, in the last example, one stripe order can be used to allocate space for one file, and another stripe order (the same or different) can be used to allocate space for another file. In any of the above scenarios, the stripe orders are generated, as described above.

Various allocation techniques can be used to perform the weighted allocation. The allocation technique selected is independent of the weight assigned to each device, thus allowing the weights to be dynamically changed. This allows the allocation policy to be changed at any time to better suit the current conditions or requirements.

The weights assigned to the devices can be dynamically changed to represent different values and/or to represent a different operating parameter (e.g., capacity, I/O throughput, round-robin, hybrid). Further, the weighting assigning technique need not be known to the allocation technique. Further, the allocation technique can accommodate various data streams, including video streams and general data streams. This is because the allocation technique does not know and need not know a priori the length of the data streams and/or the access patterns of those data streams.

The allocation capability of the present invention is able to stripe according to weight across a plurality of heterogeneous storage devices. That is, the storage devices may be of different sizes, different capacities and/or of different speeds. These heterogeneous devices can be utilized and that utilization can be maximized. For instance, storage usage can be maximized and/or throughput can be maximized.

Additionally, the allocation capability of the present invention can automatically compensate for an imbalance in the file system. Such an imbalance can be caused by adding devices to the system, removing devices from the system, or for any other reasons. The rebalancing of the system is performed without necessarily restriping space already striped. In one example, the rebalancing is accomplished by obtaining new, different and/or additional weights and using an allocation technique to allocate space based on those weights.

The above-described computing environment is offered as only one example. One or more aspects of the present invention can be incorporated and used with many types of computing units, computers, processors, nodes, systems, work stations and/or environments without departing from the spirit of the present invention. As one example, one or more aspects of the present invention can be incorporated and used in a computing environment having a single node coupled to a plurality of storage devices, in which that node may have either a traditional distributed file system or a parallel file system.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing the allocation of space on data storage devices, said method comprising:
   obtaining weights for at least a subset of a plurality of data storage devices, said subset comprising at least two data storage devices; and
   allocating space on multiple data storage devices of said at least a subset of data storage devices in proportion to weights obtained for the multiple data storage devices, wherein said allocating is independent of access patterns of data to be accommodated by the allocated space in that said allocating is performed without a priori knowledge of said access patterns, and wherein said allocating comprises generating a data stripe order to be used in allocating said space, said data stripe order indicating an order and frequency of allocating space on said multiple storage devices.

2. The method of claim 1, wherein different allocation techniques can be used in allocating said space.

3. The method of claim 1, wherein said allocating is independent of the obtaining of said weights, wherein the allocating is performed without knowledge of at least one of what the weights represent and how the weights were obtained.

4. The method of claim 1, further comprising dynamically adjusting one or more of the weights, and allocating space on one or more data storage devices using said one or more dynamically adjusted weights.

5. The method of claim 4, wherein said one or more weights were previously obtained using a first weighting technique based on a first parameter, and wherein said dynamically adjusting comprises using at least one second weighting technique in adjusting said one or more weights, wherein said at least one second weighting technique is based on at least one second parameter, wherein one or more parameters of said at least one second parameter differ from said first parameter.

6. The method of claim 1, wherein at least one data storage device of said multiple data storage devices has one or more different characteristics than at least one other data storage device of said multiple data storage devices.

7. The method of claim 1, wherein said allocating comprises:
   normalizing the weights of the multiple data storage devices to obtain multiple normalized weights; and
   using said multiple normalized weights in allocating space on said multiple data storage devices.

8. The method of claim 1, wherein said generating comprises:
   selecting a data storage device of said multiple data storage devices having a lowest current position, said selected data storage device being included in the data stripe order;
   updating the current position of the selected data storage device; and
   repeating said selecting and said updating until a desired data stripe order is generated.

9. The method of claim 8, wherein said updating the current position comprises incrementing the current position by an average allocation distance of the selected data storage device.

10. The method of claim 9, further comprising determining said average allocation distance, said determining comprising dividing a sum of normalized weights of said multiple data storage devices by a normalized weight of said selected data storage device.

11. The method of claim 8, wherein said allocating further comprises resetting a current position of one or more data storage devices of said multiple data storage devices.

12. The method of claim 1, further comprising normalizing one or more of the weights obtained for the multiple data storage devices, wherein at least one normalized weight is used in said generating.

13. The method of claim 12, wherein said generating comprises:
   selecting a data storage device of said multiple data storage devices to be included in said data stripe order, said selecting comprising summing at least one integer portion of at least one normalized weight of the one or more normalized weights until a selected number is reached, wherein the data storage device associated with the last integer portion summed is the selected data storage device; and
   repeating said selecting until a desired data stripe order is generated.

14. The method of claim 13, wherein the selected number is a random number chosen between 1 and a number of allocations remaining in a cycle of allocations.

15. The method of claim 14, further comprising determining a total number of allocations in said cycle of allocations, said determining comprising summing integer portions of normalized weights associated with the multiple data storage devices.

16. A method of managing the allocation of space on data storage devices, said method comprising:
   obtaining weights for at least a subset of a plurality of data storage devices; and
   generating a data stripe order using one or more of the weights, said data stripe order indicating an order and frequency of allocating space on multiple data storage devices of said plurality of data storage devices, and wherein the generating is independent of a weighting assignment used in obtaining said weights.

17. The method of claim 16, further comprising allocating space on said multiple data storage devices using said data stripe order, such that the space on each data storage device of said multiple data storage devices is consumed in proportion to the weight associated with that data storage device.

18. The method of claim 16, wherein said data stripe order is used in allocating space on each data storage device of said multiple data storage devices to accommodate general data streams, in which at least one of a length of the general data streams and access patterns of the general data streams are not known a priori.

19. The method of claim 16, wherein said generating comprises:
   selecting a data storage device of said multiple data storage devices having a lowest current position, said selected data storage device being included in the data stripe order;
   updating the current position of the selected data storage device; and
   repeating said selecting and said updating until a desired data stripe order is generated.

20. The method of claim 19, wherein the current position of the selected data storage device is determined using the obtained weight of said data storage device, in which the obtained weight has been normalized.

21. The method of claim 16, further comprising normalizing one or more of the weights obtained for the multiple data storage devices, wherein at least one normalized weight is used in said generating.

22. The method of claim 21, wherein said generating comprises:
   selecting a data storage device of said multiple data storage devices to be included in said data stripe order, said selecting comprising summing at least one integer portion of at least one normalized weight of the one or more normalized weights until a selected number is reached, wherein the data storage device associated with the last integer portion summed is the selected data storage device; and
   repeating said selecting until a desired data stripe order is generated.

23. The method of claim 16, wherein said data stripe order is associated with a file.

24. The method of claim 23, further comprising generating another data stripe order for another file, wherein said data stripe order and said another data stripe order are used by one or more file systems to allocate space.

25. A system of managing the allocation of space on data storage devices, said system comprising:
   means for obtaining weights for at least a subset of a plurality of data storage devices, said subset comprising at least two data storage devices; and
   means for allocating space on multiple data storage devices of said at least a subset of data storage devices in proportion to weights obtained for the multiple data storage devices, wherein the allocating is independent of access patterns of data to be accommodated by the allocated space in that said means for allocating lacks a priori knowledge of said access patterns, and wherein said means for allocating comprises means for generating a data stripe order to be used in allocating said space, said data stripe order indicating an order and frequency of allocating space on said multiple storage devices.

26. The system of claim 25, wherein said means for allocating can comprise different allocation techniques to be used in allocating said space.

27. The system of claim 25, wherein said means for allocating is independent of the means for obtaining said weights, wherein the means for allocating need not have knowledge of at least one of what the weights represent and how the weights were obtained.

28. The system of claim 25, further comprising means for dynamically adjusting one or more of the weights, and means for allocating space on one or more data storage devices using the one or more dynamically adjusted weights.

29. The system of claim 28, wherein said one or more weights were previously obtained using a first weighting technique based on a first parameter, and wherein said means for dynamically adjusting comprises means for using at least one second weighting technique in adjusting said one or more weights, wherein said at least one second weighting technique is based on at least one second parameter, wherein one or more parameters of said at least one second parameter differ from said first parameter.

30. The system of claim 25, wherein at least one data storage device of said multiple data storage devices has one or more different characteristics than at least one other data storage device of said multiple data storage devices.

31. The system of claim 25, wherein said means for allocating comprises:
   means for normalizing the weights of the multiple data storage devices to obtain multiple normalized weights; and
   means for using said multiple normalized weights in allocating space on said multiple data storage devices.

32. The system of claim 25, wherein said means for generating comprises:
   means for selecting a data storage device of said multiple data storage devices having a lowest current position, said selected data storage device being included in the data stripe order;
   means for updating the current position of the selected data storage device; and
   means for repeating the selecting and the updating until a desired data stripe order is generated.

33. The system of claim 32, wherein said means for updating the current position comprises means for incrementing the current position by an average allocation distance of the selected data storage device.

34. The system of claim 33, further comprising means for determining said average allocation distance, said determining comprising means for dividing a sum of normalized weights of said multiple data storage devices by a normalized weight of said selected data storage device.

35. The system of claim 32, wherein said means for allocating further comprises means for resetting a current position of one or more data storage devices of said multiple data storage devices.

36. The system of claim 35, further comprising means for normalizing one or more of the weights obtained for the multiple data storage devices, wherein at least one normalized weight is used in the generating.

37. The system of claim 36, wherein said means for generating comprises:
   means for selecting a data storage device of said multiple data storage devices to be included in said data stripe order, said means for selecting comprising means for summing at least one integer portion of at least one normalized weight of the one or more normalized weights until a selected number is reached, wherein the data storage device associated with the last integer portion summed is the selected data storage device; and
   means for repeating the selecting until a desired data stripe order is generated.

38. The system of claim 37, wherein the selected number is a random number chosen between 1 and a number of allocations remaining in a cycle of allocations.

39. The system of claim 38, further comprising means for determining a total number of allocations in said cycle of allocations, said means for determining comprising means for summing integer portions of normalized weights associated with the multiple data storage devices.

40. A system of managing the allocation of space on data storage devices, said system comprising:
   means for obtaining weights for at least a subset of a plurality of data storage devices; and
   means for generating a data stripe order using one or more of the weights, said data stripe order indicating an order and frequency of allocating space on multiple data storage devices of said plurality of data storage devices, and wherein the generating is independent of a weighting assignment used in obtaining said weights.

41. The system of claim 40, further comprising means for allocating space on said multiple data storage devices using said data stripe order, such that the space on each data storage device of said multiple data storage devices is consumed in proportion to the weight associated with that data storage device.

42. The system of claim 40, wherein said data stripe order is used in allocating space on each data storage device of said multiple data storage devices to accommodate general data streams, in which at least one of a length of the general data streams and access patterns of the general data streams are not known a priori.

43. The system of claim 40, wherein said means for generating comprises:
   means for selecting a data storage device of said multiple data storage devices having a lowest current position, said selected data storage device being included in the data stripe order;
   means for updating the current position of the selected data storage device; and
   means for repeating the selecting and the updating until a desired data stripe order is generated.

44. The system of claim 43, wherein the current position of the selected data storage device is determined using the obtained weight of said data storage device, in which the obtained weight has been normalized.

45. The system of claim 40, further comprising means for normalizing one or more of the weights obtained for the multiple data storage devices, wherein at least one normalized weight is used in the generating.

46. The system of claim 45, wherein said means for generating comprises:
   means for selecting a data storage device of said multiple data storage devices to be included in said data stripe order, said means for selecting comprising means for summing at least one integer portion of at least one normalized weight of the one or more normalized weights until a selected number is reached, wherein the data storage device associated with the last integer portion summed is the selected data storage device; and
   means for repeating the selecting until a desired data stripe order is generated.

47. The system of claim 40, wherein said data stripe order is associated with a file.

48. The system of claim 47, further comprising means for generating another data stripe order for another file, wherein said data stripe order and said another data stripe order are used by one or more file systems to allocate space.

49. A system of managing the allocation of space on data storage devices, said system comprising:
   a node adapted to obtain weights for at least a subset of a plurality of data storage devices, said subset comprising at least two data storage devices; and
   said node being further adapted to allocate space on multiple data storage devices of said at least a subset of data storage devices in proportion to weights obtained for the multiple data storage devices, wherein the allocating is independent of access patterns of data to be accommodated by the allocated space in that said allocating is performed without a priori knowledge of said access patterns, and wherein the allocating comprises generating a data stripe order to be used in allocating said space, said data stripe order indicating an order and frequency of allocating space on said multiple storage devices.

50. A system of managing the allocation of space on data storage devices, said system comprising:
   a node adapted to obtain weights for at least a subset of a plurality of data storage devices; and
   said node being further adapted to generate a data stripe order using one or more of the weights, said data stripe order indicating an order and frequency of allocating space on multiple data storage devices of said plurality of storage devices, and wherein the generating is independent of a weighting assignment used in obtaining said weights.

51. At least one program storage device readable by a machine, tangibly embodying at least one program of instructions executable by the machine to perform a method of managing the allocation of space on data storage devices, said method comprising:
   obtaining weights for at least a subset of a plurality of data storage devices, said subset comprising at least two data storage devices; and
   allocating space on multiple data storage devices of said at least a subset of data storage devices in proportion to weights obtained for the multiple data storage devices, wherein said allocating is independent of access patterns of data to be accommodated by the allocated space in that said allocating is performed without a priori knowledge of said access patterns, and wherein said allocating comprises generating a data stripe order to be used in allocating said space, said data stripe order indicating an order and frequency of allocating space on said multiple storage devices.

52. The at least one program storage device of claim 51, wherein different allocation techniques can be used in allocating said space.

53. The at least one program storage device of claim 51, wherein said allocating is independent of the obtaining of said weights, wherein the allocating is performed without knowledge of at least one of what the weights represent and how the weights were obtained.

54. The at least one program storage device of claim 51, wherein said method further comprises dynamically adjusting one or more of the weights, and allocating space on one or more data storage devices using said one or more dynamically adjusted weights.

55. The at least one program storage device of claim 54, wherein said one or more weights were previously obtained using a first weighting technique based on a first parameter, and wherein said dynamically adjusting comprises using at least one second weighting technique in adjusting said one or more weights, wherein said at least one second weighting technique is based on at least one second parameter, wherein one or more parameters of said at least one second parameter differ from said first parameter.

56. The at least one program storage device of claim 51, wherein at least one data storage device of said multiple data storage devices has one or more different characteristics than at least one other data storage device of said multiple data storage devices.

57. The at least one program storage device of claim 51, wherein said allocating comprises:

normalizing the weights of the multiple data storage devices to obtain multiple normalized weights; and using said multiple normalized weights in allocating space on said multiple data storage devices.

58. The at least one program storage device of claim 51, wherein said generating comprises:

selecting a data storage device of said multiple data storage devices having a lowest current position, said selected data storage device being included in the data stripe order;

updating the current position of the selected data storage device; and repeating said selecting and said updating until a desired data stripe order is generated.

59. The at least one program storage device of claim 58, wherein said updating the current position comprises incrementing the current position by an average allocation distance of the selected data storage device.

60. The at least one program storage device of claim 59, wherein said method further comprises determining said average allocation distance, said determining comprising dividing a sum of normalized weights of said multiple data storage devices by a normalized weight of said selected data storage device.

61. The at least one program storage device of claim 58, wherein said allocating further comprises resetting a current position of one or more data storage devices of said multiple data storage devices.

62. The at least one program storage device of claim 51, wherein said method further comprises normalizing one or more of the weights obtained for the multiple data storage devices, wherein at least one normalized weight is used in said generating.

63. The at least one program storage device of claim 62, wherein said generating comprises:

selecting a data storage device of said multiple data storage devices to be included in said data stripe order, said selecting comprising summing at least one integer portion of at least one normalized weight of the one or more normalized weights until a selected number is reached, wherein the data storage device associated with the last integer portion summed is the selected data storage device; and repeating said selecting until a desired data stripe order is generated.

64. The at least one program storage device of claim 63, wherein the selected number is a random number chosen between 1 and a number of allocations remaining in a cycle of allocations.

65. The at least one program storage device of claim 64, wherein said method further comprises determining a total number of allocations in said cycle of allocations, said determining comprising summing integer portions of normalized weights associated with the multiple data storage devices.

66. At least one program storage device readable by a machine, tangibly embodying at least one program of instructions executable by the machine to perform a method of managing the allocation of space on data storage devices, said method comprising:

obtaining weights for at least a subset of a plurality of data storage devices; and generating a data stripe order using one or more of the weights, said data stripe order indicating an order and frequency of allocating space on multiple data storage devices of said plurality of data storage devices, and wherein the generating is independent of a weighting assignment used in obtaining said weights.

67. The at least one program storage device of claim 66, wherein said method further comprises allocating space on said multiple data storage devices using said data stripe order, such that the space on each data storage device of said multiple data storage devices is consumed in proportion to the weight associated with that data storage device.

68. The at least one program storage device of claim 66, wherein said data stripe order is used in allocating space on each data storage device of said multiple data storage devices, to accommodate general data streams in which at least one of a length of the general data streams and access patterns of the general data streams are not known a priori.

69. The at least one program storage device of claim 66, wherein said generating comprises:

selecting a data storage device of said multiple data storage devices having a lowest current position, said selected data storage device being included in the data stripe order;

updating the current position of the selected data storage device; and repeating said selecting and said updating until a desired data stripe order is generated.

70. The at least one program storage device of claim 69, wherein the current position of the selected data storage device is determined using the obtained weight of said data storage device, in which the obtained weight has been normalized.

71. The at least one program storage device of claim 66, wherein said method further comprises normalizing one or more of the weights obtained for the multiple data storage devices, wherein at least one normalized weight is used in said generating.

72. The at least one program storage device of claim 71, wherein said generating comprises:

selecting a data storage device of said multiple data storage devices to be included in said data stripe order, said selecting comprising summing at least one integer portion of at least one normalized weight of the one or more normalized weights until a selected number is reached, wherein the data storage device associated with the last integer portion summed is the selected data storage device; and repeating said selecting until a desired data stripe order is generated.

73. The at least one program storage device of claim 66, wherein said data stripe order is associated with a file.

74. The at least one program storage device of claim 73, wherein said method further comprises generating another data stripe order for another file, wherein said data stripe order and said another data stripe order are used by one or more file systems to allocate space.

* * * * *

UNITED STATES PATENT AND TRADEMARK OFFICE
CERTIFICATE OF CORRECTION

PATENT NO.    : 6,829,678 B1
DATED         : December 7, 2004
INVENTOR(S)   : Sawdon et al.

It is certified that error appears in the above-identified patent and that said Letters Patent is hereby corrected as shown below:

Column 9,
Line 12, after the line insert -- deviceFound: --

Column 15,
Line 1, delete "35" and insert -- 25 --

Signed and Sealed this

Twenty-second Day of March, 2005

JON W. DUDAS
*Director of the United States Patent and Trademark Office*